US008895653B2

(12) United States Patent
Oda et al.

(10) Patent No.: US 8,895,653 B2
(45) Date of Patent: Nov. 25, 2014

(54) ACRYLIC ADHESIVE COMPOSITION, AND PRESSURE-SENSITIVE ADHESIVE SHEET EMPLOYING THE SAME

(75) Inventors: Takashi Oda, Ibaraki (JP); Kenji Tamura, Tsukuba (JP)

(73) Assignee: National Institute for Materials Science, Tsukuba-shi (JP)

( * ) Notice: Subject to any disclaimer, the term of this patent is extended or adjusted under 35 U.S.C. 154(b) by 590 days.

(21) Appl. No.: 12/738,135

(22) PCT Filed: Oct. 15, 2008

(86) PCT No.: PCT/JP2008/068636
§ 371 (c)(1),
(2), (4) Date: Sep. 27, 2010

(87) PCT Pub. No.: WO2009/051130
PCT Pub. Date: Apr. 23, 2009

(65) Prior Publication Data
US 2011/0190436 A1    Aug. 4, 2011

(30) Foreign Application Priority Data
Oct. 18, 2007  (JP) .................. 2007-271689

(51) Int. Cl.
| C08K 3/10 | (2006.01) |
| C01F 7/00 | (2006.01) |
| C01G 9/00 | (2006.01) |
| C01G 51/00 | (2006.01) |
| C01G 53/00 | (2006.01) |
| C09C 1/40 | (2006.01) |
| C09J 133/08 | (2006.01) |
| C08K 5/00 | (2006.01) |
| C08K 9/04 | (2006.01) |

(52) U.S. Cl.
CPC . *C01F 7/005* (2013.01); *C01G 9/00* (2013.01); *C01G 51/00* (2013.01); *C01G 53/00* (2013.01); *C09C 1/40* (2013.01); *C09J 133/08* (2013.01); *C01P 2002/22* (2013.01); *C08K 5/0025* (2013.01); *C08K 9/04* (2013.01); *C01P 2002/78* (2013.01)
USPC ........... 524/435; 524/436; 524/434; 524/437; 524/560; 524/556; 156/332; 156/325

(58) Field of Classification Search
CPC ...................................... C01F 7/005
USPC ................. 524/435, 436, 437, 560, 556
See application file for complete search history.

(56) References Cited

U.S. PATENT DOCUMENTS

| 6,087,433 | A  | * | 7/2000 | Hanada et al. ............. 524/492 |
| 7,786,202 | B2 | * | 8/2010 | Schomaker et al. ........ 524/381 |
| 2003/0175512 | A1 | * | 9/2003 | Ishiguro et al. ........ 428/355 AC |
| 2008/0249221 | A1 | * | 10/2008 | Corkery et al. ............. 524/404 |

FOREIGN PATENT DOCUMENTS

| EP | 1895335 A1 | 3/2008 |
| JP | 2002-363522 A | 12/2002 |
| JP | 2003-221226 A | 8/2003 |
| JP | 2003-226681 A | 8/2003 |
| JP | 2005-89269 A | 4/2005 |
| JP | 2005-154581 A | 6/2005 |
| JP | 2005-344008 A | 12/2005 |
| JP | 2006-291120 A | 10/2006 |
| WO | WO 2007065877 A1 * | 6/2007 ............. C01B 13/36 |

OTHER PUBLICATIONS

Notification of Transmittal of Translation of the International Preliminary Report on Patentability (Form PCT/IB/338) of International Application No. PCT/JP2008/068636 mailed May 20, 2010 with Forms PCT/IB/373 and PCT/ISA/237.
Supplementary European Search Report dated Sep. 16, 2011, issued in corresponding European Patent Application No. 08840397.7.
International Search Report of PCT/JP2008/068636, mailing date of Jan. 6, 2009.

* cited by examiner

*Primary Examiner* — Irina Krylova
(74) *Attorney, Agent, or Firm* — Westerman, Hattori, Daniels & Adrian, LLP

(57) ABSTRACT

There is provided an acrylic adhesive composition which comprises: (A) a vinyl polymer comprising a homopolymer or a copolymer of an alkyl (meth)acrylate having a C4 to C14 alkyl group; (B) an organophilic layered double hydroxide organically treated with an organic anion; and (C) a crosslinking agent. Therefore the obtained adhesive composition has sufficient adhesiveness to an object, excellent heat resistance and excellent adhesive properties particularly at higher temperatures, and is substantially free from variations in adhesiveness.

9 Claims, No Drawings

ACRYLIC ADHESIVE COMPOSITION, AND PRESSURE-SENSITIVE ADHESIVE SHEET EMPLOYING THE SAME

TECHNICAL FIELD

The present invention relates to an acrylic adhesive composition, and a pressure-sensitive adhesive sheet employing the same. More specifically, the invention relates to an acrylic adhesive composition which has sufficient adhesiveness to an object, excellent heat resistance and excellent adhesive properties particularly at higher temperatures, and is substantially free from variations in adhesiveness, and to a pressure-sensitive adhesive sheet employing the adhesive composition.

BACKGROUND OF THE INVENTION

In recent years, adhesive tapes have come to be employed in a wide range of applications, e.g., for production and construction of electronic parts and automotive parts. In these applications, the adhesive tapes are often subjected to higher stresses and higher temperatures during use and, therefore, required to be highly cohesive and heat-resistant. Particularly, adhesive tapes to be used in production processes for electronic parts, semiconductor devices and flat display devices such as LCDs and PDPs are generally subjected to temperatures of 100° C. or higher and, therefore, required to have sufficient adhesiveness and cohesiveness at higher temperatures.

However, prior-art adhesive compositions are disadvantageously poorer in heat resistance and cohesiveness at higher temperatures. One approach to this problem is to blend various types of inorganic fillers to an adhesive agent for improvement of the cohesiveness and the heat resistance. Particularly, it is reported that, where a lipophilic layered clay mineral (hereinafter referred to simply as "layered clay mineral") is dispersed as the inorganic filler in the adhesive agent, the heat resistance and the cohesiveness are both improved (see Patent Documents 1 and 2).

Patent Document 1: JP-A-2005-344008
Patent Document 2: JP-A-2005-154581

However, even if an organophilic layered clay mineral prepared by organically modifying a layered clay mineral (e.g., a smectite such as montmorillonite, beidellite, nontronite, saponite, hectorite or stevensite, or a mica such as muscovite, phlogopite, taeniolite, biotite, margarite, clintonite or tetrasilisic mica) with an alkyl ammonium salt is dispersed in the adhesive agent, the organophilic layered clay mineral does not undergo complete interlayer separation, but is present in an adhesive agent layer with its layers being in a stacked state. This results in variations in adhesiveness at higher temperatures.

BRIEF SUMMARY OF THE INVENTION

In view of the foregoing, it is an object of the present invention to provide an acrylic adhesive composition which has sufficient adhesiveness to an object, excellent heat resistance and excellent adhesive properties particularly at higher temperatures, and is substantially free from variations in adhesiveness, and to provide a pressure-sensitive adhesive sheet employing the adhesive composition.

According to a first aspect of the present invention to achieve the aforementioned object, there is provided an acrylic adhesive composition which comprises: (A) a vinyl polymer comprising a homopolymer or a copolymer of an alkyl (meth)acrylate having a $C_4$ to $C_{14}$ alkyl group; (B) an organophilic layered double hydroxide organically treated with an organic anion; and (C) a crosslinking agent.

According to a second aspect of the present invention, there is provided a pressure-sensitive adhesive sheet comprising the acrylic adhesive composition according to the first inventive aspect.

Inventors of the present invention conducted intensive studies on an inorganic filler and a resin composition in order to provide an adhesive material having sufficient adhesiveness and sufficient heat resistance. As a result, the inventors found that a layered clay mineral dispersed in an adhesive agent does not undergo complete interlayer separation, but the layered clay mineral is dispersed in the adhesive agent with its layers being in a stacked state. Therefore, the resulting adhesive composition suffers from variations in physical properties. Further, the inventors found that, where an adhesive tape is produced by using the adhesive composition, stress is liable to be concentrated on peripheries of particles of the layered clay mineral in the adhesive agent during peel-off of the adhesive tape, resulting in cohesive failure of the adhesive agent. As a result of further studies, the inventors found that, where an organophilic layered double hydroxide (B) organically treated with an organic anion is used in combination with a specific vinyl polymer (A) and a crosslinking agent (C) as described above, a pressure-sensitive adhesive sheet can be provided which has sufficient adhesiveness to an object, excellent heat resistance and excellent adhesive properties particularly at higher temperatures and is substantially free from variations in adhesiveness. The physical properties of the adhesive composition are improved with little variations supposedly because the organic treatment with the organic anion promotes the interlayer separation of the layered double hydroxide, and the use of the organophilic layered double hydroxide in combination with the specific vinyl polymer and the crosslinking agent further disintegrates the layered double hydroxide in the adhesive agent and improves the dispersibility.

DETAILED DESCRIPTION OF THE INVENTION

As described above, the present invention provides an acrylic adhesive composition which comprises a vinyl polymer (A) comprising a homopolymer or copolymer of a specific alkyl (meth)acrylate, an organophilic layered double hydroxide (B) organically treated with an organic anion, and a crosslinking agent (C). Such adhesive composition has sufficient adhesiveness to an object, excellent heat resistance and excellent adhesive properties particularly at higher temperatures, and is substantially free from variations in adhesiveness. Accordingly, a pressure-sensitive adhesive sheet comprising the adhesive composition as an adhesive agent has the same advantageous effects.

Where the organic anion for the component (B) is at least one of an anion derived from an amino acid, such as an amino acid anion, and an anion derived from a fatty acid, such as a fatty acid anion, the dispersibility of the layered double hydroxide in the adhesive agent is improved, thereby suppressing variations in physical properties.

Where a layered double hydroxide to be organically treated to provide the component (B) is a non-stoichiometric compound represented by one of the following general formulae (1) and (2), the adhesive composition is superior in adhesiveness and heat resistance.

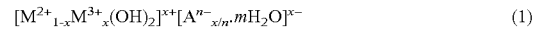  (1)

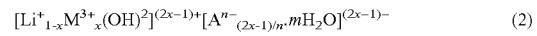  (2)

wherein $M^{2+}$ is a metal ion of at least one divalent metal selected from the group consisting of Mg, Ca, Mn, Fe, Co, Ni, Cu and Zn; $M^{3+}$ is a metal ion of at least one trivalent metal selected from the group consisting of Al, Fe, Cr, Mn, Co, Ni, La and Ga; $A^{n-}$ is an n-valent inorganic anion selected from the group consisting of $OH^-$, $ClO_3^-$, $ClO_4^-$, $F^-$, $Cl^-$, $Br^-$, $I^-$, $CO_3^{2-}$, $NO_3^-$ and $SO_4^{2-}$; x is a positive number of $0<x<0.5$; m is a positive number of $0<m$; and n is a valence of the inorganic anion.

Where the proportion of the component (B) is not less than 1 part by weight and less than 20 parts by weight based on 100 parts by weight of the component (A), the adhesive composition is free from variations in adhesiveness, and improved in cohesiveness and heat resistance without impairment of fluidity and formability.

Where the component (A) is a copolymer of butyl acrylate and acrylic acid, the adhesive composition is further excellent in adhesiveness and cohesiveness.

Where the component (C) crosslinks molecular chains of the vinyl polymer (A) and is at least one selected from the group consisting of a multifunctional (meth)acrylate having at least two (meth)acryloyl functional groups in its molecule, an isocyanate compound and an epoxy compound, the adhesive composition is further excellent in cohesiveness and heat resistance.

BEST MODE FOR CARRYING OUT THE INVENTION

An acrylic adhesive composition (hereinafter sometimes referred to simply as "adhesive composition") according to the present invention contains a specific vinyl polymer (A), a layered double hydroxide (B) organically treated with an organic anion (hereinafter sometimes referred to simply as "organophilic layered double hydroxide") and a crosslinking agent (C).

Vinyl Polymer (A)

As previously described, the vinyl polymer (A) is a homopolymer or a copolymer of an alkyl (meth)acrylate having a $C_4$ to $C_{14}$ alkyl group. The homopolymer or the copolymer are prepared by polymerizing a polymerizable monomer containing an alkyl (meth)acrylate having a $C_4$ to $C_{14}$ alkyl group as a major component. In the present invention, the (meth)acrylate is defined as at least one of an acrylate and a methacrylate.

Examples of an alkyl (meth)acrylate having the $C_4$ to $C_{14}$ alkyl group (hereinafter sometimes referred to simply as "alkyl (meth)acrylate") include acrylates and methacrylates each having a $C_4$ to $C_{14}$ alkyl group such as a butyl group, an isobutyl group, a pentyl group, an isopentyl group, a hexyl group, a butyl group, an octyl group, an isooctyl group, a nonyl group, an isononyl group, a decyl group or an isodecyl group. These may be used either alone or in combination as the major polymerizable monomer.

As the polymerizable monomer, other copolymerizable monomer may be used in combination with the alkyl (meth) acrylate. Particularly, a polar-group-containing monomer is preferably used in combination with the alkyl (meth)acrylate.

Examples of the polar-group-containing monomer include unsaturated acids such as (meth)acrylate, itaconic acid, 2-acrylamidopropanesulfonic acid, and hydroxyl-containing monomers such as 2-hydroxyethyl (meth)acrylate and 2-hydroxypropyl (meth)acrylate, which may be used either alone or in combination.

Here, "the alkyl (meth)acrylate as the major component" means that the alkyl (meth)acrylate accounts for a major percentage of the entire polymerizable monomer, and means that the polymerizable monomer may contain the alkyl (meth)acrylate alone (to provide the homopolymer).

Where the alkyl (meth)acrylate and the polar-group-containing monomer are used in combination, the proportion of the alkyl (meth)acrylate is preferably 85 to 97 wt %, more preferably 90 to 95 wt %, based on the weight of the polymerizable monomer, and the proportion of the polar-group-containing monomer is preferably 15 to 3 wt %, more preferably 10 to 5 wt %, based on the weight of the polymerizable monomer. If the proportion of the latter is greater than the upper limit described above, the resulting adhesive composition tends to have higher adhesiveness and lower breaking elongation, failing to have advantageous properties. On the other hand, if the proportion of the latter is less than the lower limit described above, the resulting adhesive composition tends to be poorer in adhesiveness and cohesiveness.

Organophilic Layered Double Hydroxide (B)

The organophilic layered double hydroxide (B) to be used in combination with the vinyl polymer (A) is prepared by organically treating an untreated layered double hydroxide (subjected to no organic treatment) with the organic anion. Typically usable as the organophilic layered double hydroxide (B) is a layered double hydroxide prepared by ion-exchanging exchangeable anions (inorganic anions) present between layers of the untreated layered double hydroxide with organic anions.

Untreated Layered Double Hydroxide

The untreated layered double hydroxide has a layered structure such that hydroxide layers composed of hydroxides containing metal ions of a monovalent or divalent metal and metal ions of a trivalent metal and inorganic anion intermediate layers are alternately stacked, and water molecules are intercalated between the layers (water is condensed between the layers). The layered double hydroxide typically has a crystalline structure. An example of the monovalent metal is Li. Examples of the divalent metal include Mg, Ca, Mn, Fe, Co, Ni, Cu and Zn. Examples of the trivalent metal include Al, Fe, Cr, Mn, Co, Ni, La and Ga. The hydroxide layers each include oxygen octahedrons two-dimensionally arranged with metal ions of the monovalent or divalent metal and the metal ions of the trivalent metal located at centers of the oxygen octahedrons.

The untreated layered double hydroxide is known as so-called "hydrotalcite" which is a natural mineral represented by $Mg_6Al_2(OH)_{16}.CO_3.4-5H_2O$. A variety of minerals, such as Stichtite, Pyroaurite, Reevesite, Takovite, Honessite and Iowaite, having the same or similar crystalline structure have been discovered. These minerals are synthesizable. These minerals are generally called "hydrotalcite-like" compounds, which are represented, for example, by the following general formula (1) or (2):

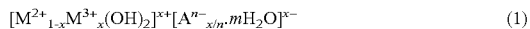
$$[M^{2+}{}_{1-x}M^{3+}{}_x(OH)_2]^{x+}[A^{n-}{}_{x/n}.mH_2O]^{x-} \tag{1}$$

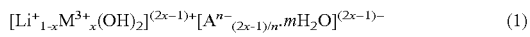
$$[Li^+{}_{1-x}M^{3+}{}_x(OH)_2]^{(2x-1)+}[A^{n-}{}_{(2x-1)/n}.mH_2O]^{(2x-1)-} \tag{1}$$

wherein $M^{2+}$ is a metal ion of at least one divalent metal selected from the group consisting of Mg, Ca, Mn, Fe, Co, Ni, Cu and Zn; $M^{3+}$ is a metal ion of at least one trivalent metal selected from the group consisting of Al, Fe, Cr, Mn, Co, Ni, La and Ga; $A^{n-}$ is an n-valent inorganic anion selected from the group consisting of $OH^-$, $ClO_3^-$, $ClO_4^-$, $F^-$, $Cl^-$, $Br^-$, $I^-$, $CO_3^{2-}$, $NO_3^-$ and $SO_4^{2-}$; x is a positive number of $0<x<0.5$; m is a positive number of $0<m$; and n is a valence of the inorganic anion.

The compound of the divalent-trivalent system (containing the divalent metal ion and the trivalent metal ion in combination) represented by the general formula (1) is a non-stoichiometric compound (0<x<0.5), and can be synthesized as having different combinations of the divalent metal ion and the trivalent metal ion and different composition ratios.

The crystalline structure of the compound is as follows. Basic layers $[M^{2+}_{1-x}M^{3+}_x(OH)_2]^{x+}$, which are similar to those of Brucite ($Mg(OH)_2$) and have positive charges, are produced by replacing some of divalent metal ions ($M^{2+}$) with trivalent metal ions ($M^{3+}$). Then, inorganic anion intermediate layers ($[A^{n-}_{x/n}.mH_2O]^{x-}$) having negative charges are formed to electrically neutralize the basic layers. Thus, a layered structure is formed which includes the basic layers and the inorganic anion intermediate layers. In the layered structure, the water molecules are typically hydrogen-bonded with hydroxide groups in the basic layers, and maintained in association with the anion intermediate layers.

In Carlos J. Serna, Jose L. Rendon, Juan E. Iglesias, "Crystal-chemical study of layered $[Al_2Li(OH)_6]^{PL}X(super-).nH_2O$," Clays and Clay Minerals, Jun. 1982, 30, 180-184, it is reported that the compound of the monovalent-trivalent system (containing the monovalent metal ion and the trivalent metal ion in combination) represented by the general formula (2) provides a layered double hydroxide having a crystalline structure similar to that described above. That is, trivalent metal ions (e.g., Al ions) are arranged in a Gibbsite structure, and vacancies in the structure are filled with monovalent metal ions (e.g., Li ions) to provide two-dimensional layers, which are electrically neutralized with anions intercalated between the layers.

The untreated layered double hydroxide (LDH) to be used in the present invention is generally intended to include Hydrotalcite and Hydrotalcite-like compounds to be described below.

The Hydrotalcite and the Hydrotalcite-like compounds each have a structural unit including positively charged basic layers, inorganic anion intermediate layers which electrically neutralize the positive charges of the basic layers, and crystal water. It is known that these compounds have substantially the same properties except for structural failure temperature. These compounds are basic in solid state and anion-exchangeable, and undergo specific reactions such as an intercalation reaction and a reconstruction reaction. These compounds are described in detail in Miyata Shigeo, "Properties and Applications of Hydrotalcites," Smectite Newsletter, Smectite, Vol. 6, No. 1, p. 12-26, 1996 May.

In the present invention, the untreated layered double hydroxide is organically treated with the organic anion in order to improve the affinity for the vinyl polymer (A).

Organically Treated Layered Double Hydroxide

The organically treated layered double hydroxide (hereinafter referred to simply as "organophilic layered double hydroxide") to be used in the present invention is a layered double hydroxide prepared by ion-exchanging exchangeable anions (inorganic anions) present between the layers of the untreated layered double hydroxide with organic anions.

Preferred examples of the organic anions to be used for the organic treatment include organic anions derived from an amino acid, a fatty acid and the like.

Examples of the organic anion derived from the amino acid include amino acid anions and peptide anions. More specifically, these anions may be prepared by using a neutral amino acid, a basic amino acid, an amino acid having at least two acidic groups, a salt (an alkali metal salt such as a sodium salt or a potassium salt, an alkali earth metal salt such as a magnesium salt or a calcium salt) of the amino acid, or a peptide. These may be used either alone or in combination.

Examples of the neutral amino acid include glycine (Gly), alanine (Ala), valine (Val), leucine (Leu), isoleucine (Ile), norleucine, serine (Ser), threonine (Thr), cysteine (Cys), methionine (Met), proline (Pro), phenylalanine (Phe), tyrosine (Tyr), aspartic acid (Asn), glutamine (Gln), thyronine, lanthionine, cystathionine, homoserine and tryptophan (Trp), which may be used either alone or in combination.

Examples of the basic amino acid include lysine (Lys), hydroxylysine (Hyl), arginine (Arg), histidine (His) and ornithine, which may be used either alone or in combination. Among these basic amino acids, lysine (Lys), hydroxylysine (Hyl) and arginine (Arg) are preferably used.

Examples of the amino acid having at least two acidic groups include: natural amino acids such as aspartic acid (Asp) and glutamic acid (Glu), and peptides of these amino acids; and non-natural amino acids such as β-alanine-N,N-diacetic acid, aminobarbituric acid-N,N-diacetic acid, 2-aminobenzoic acid-N,N-diacetic acid, 3-aminobenzoic acid-N,N-diacetic acid, 4-aminobenzoic acid-N,N-diacetic acid, 2-phosphoethylimino-N,N-diacetic acid, 2-sulfoethylimino-N,N-diacetic acid, aminomethylphosphonic acid-N,N-diacetic acid, iminodiacetic acid, iminodipropionic acid, nitrilotriacetic acid (NTA), aniline diacetic acid, sulfoaniline diacetic acid, 3-sulfoaniline diacetic acid, 4-sulfoaniline diacetic acid, 1,2-diaminocyclohexane-N,N-tetraacetic acid (DCyTA), 1,3-diaminocyclohexane-N,N-tetraacetic acid, 1,4-diaminocyclohexane-N,N-tetraacetic acid, ethylenediamine-N,N-diacetic acid, ethylenediaminetetraacetic acid (EDTA), N-benzylethylenediaminetriacetic acid, N-butylethylenediaminetriacetic acid, N-cyclohexylethylenediaminetriacetic acid, ethylenediaminedipropionic acid, ethylenediaminetetrapropionic acid, glycine propionic acid, methylimino-N,N-diacetic acid, trimethylenediaminetetraacetic acid, tetradiaminetetraacetic acid {tetramethylenediaminetetraacetic acid} and pentamethylenediaminetetraacetic acid, which may be used either alone or in combination.

Among these amino acids, aspartic acid (Asp), glutamic acid (Glu), nitrilotriacetic acid (NTA), 1,2-diaminocyclohexane-N,N-tetraacetic acid (DCyTA), ethylenediamine-N,N-diacetic acid and ethylenediaminetetraacetic acid (EDTA) are particularly preferred. In the present invention, the amino acid is defined in a broader sense as including an L-amino acid and D-amino acid, and including not only an α-amino acid but also a β-amino acid and a γ-amino acid.

Other examples include: amino acid derivatives such as 6-aminohexylcarboxylic acid, 12-aminolaurylcarboxylic acid, N,N-dimethyl-6-aminohexylcarboxylic acid, N-n-dodecyl-N,N-dimethyl-10-aminodecylcarboxylic acid and dimethyl-N-12-aminolaurylcarboxylic acid; sulfur-containing compounds such as 2-chlorobenzothiazole, thioacetic acid, methyldithiocarbamic acid and dimethyldithianocarbamic acid, and salts thereof; and nitrogen-containing heterocyclic compounds such as 2-mercaptothiazoline, 2,5-dimercapto-1,3,4-thiadiazole, 1-carboxymethyl-5-mercapto-1H-tetrazole and 2,4,6-trimercapto-s-triazine and salts thereof. These may be used either alone or in combination.

Examples of the organic anion derived from the fatty acid include anions of monocarboxylic acids represented by the following general formula (3). Specific examples of the monocarboxylic acids include aliphatic carboxylic acids such as 2-ethylhexoic acid, lauric acid, myristic acid, palmitic acid, stearic acid, hydroxystearic acid, linoleic acid, behenic acid, isostearic acid, oleic acid, ricinoleic acid, caproic acid, heptanoic acid, n- or iso-octylic acid, pelargonic acid, capric acid, isodecanoic acid, undecylic acid, neo-tridecanoic acid, acetoacetic acid and acetic acid, which may be used either alone or in combination.

$$R^1\text{—COOH} \quad (3)$$

wherein $R^1$— is a $C_1$ to $C_{24}$ alkyl group, a $C_2$ to $C_{24}$ alkenyl group, or an unsubstituted or an alkyl-substituted phenyl group.

The organic anion may be an anion of a monosulfonic acid represented by the following general formula (4), and specific examples of the monosulfonic acid include dodecylsulfuric acid and dodecylbenzenesulfuric acid.

$$R^2—SO_3H \quad (4)$$

wherein $R^2$— is a $C_1$ to $C_{24}$ alkyl group, a $C_2$ to $C_{24}$ alkenyl group, or an unsubstituted or an alkyl-substituted phenyl group.

Further, the organic anion may be an anion of a dicarboxylic acid represented by the following general formula (5), and specific examples of the dicarboxylic acid include dibasic acids such as oxalic acid, maleic acid, thiodipropionic acid and dithiopropionic acid, esters of any of these dibasic acids with a substituted or unsubstituted aliphatic, alicyclic or aromatic alcohol, and cyclic organic acids such as benzoic acid, methylbenzoic acid, butylbenzoic acid, p-t-butylbenzoic acid, phenylacetic acid, salicylic acid, fumaric acid, naphthoic acid, abietic acid, phenylstearic acid, hydrinecarboxylic acid, cinnamic acid, rhodinic acid and naphthenic acid, which may be used either alone or in combination.

$$HOOC—R^3—COOH \quad (5)$$

wherein $R^3$— is a $C_1$ to $C_{24}$ alkyl group, a $C_2$ to $C_{24}$ alkenyl group or an unsubstituted or an alkyl-substituted phenylene group.

Ion Exchange for Organic Modification

The untreated layered double hydroxide intrinsically includes interlayer anions, which are ion-exchangeable. In the present invention, the exchangeable anions are ion-exchanged with the organic anions in order to increase the affinity for the vinyl polymer (A) and to promote interlayer separation of the layered double hydroxide. For the ion exchange, the intended anions (organic anions) are intercalated into the layered double hydroxide through direct ion exchange in an aqueous solution or through ion exchange by a reconstruction method. Ions having a higher charge density are more easily intercalated for the ion exchange, so that anions each having a higher valence and a smaller ion radius are more easily intercalated between the layers. Therefore, a layered double hydroxide containing monovalent anions such as chloride ions or nitrate ions between layers thereof is preferably used as a precursor for the ion exchange.

For the direct ion exchange in the aqueous solution, the layered double hydroxide containing the interlayer monovalent anions is generally used as a host for the intercalation. The layered double hydroxide is preferably synthesized in a nitrogen gas atmosphere or by bubbling nitrogen gas in order to minimize contamination with carbonate ions from the air. Since the layered double hydroxide specifically has affinity for the carbonate ions, the layered double hydroxide is liable to be converted into a layered double hydroxide of a carbonate ion type with most anions thereof exchanged with the carbonate ions, failing to undergo the ion exchange with the intended anions (organic anions).

The layered double hydroxide can be reconstructed by immersing a pyrolysis product of the layered double hydroxide in an aqueous solution. By utilizing this nature rather than by the direct ion exchange in the aqueous solution, the intended anions (organic anions) can be intercalated into the layered double hydroxide (reconstruction method). That is, when the pyrolysis product of the layered double hydroxide is immersed in the aqueous solution, anions present in the aqueous solution are intercalated into the pyrolysis product to reconstruct the layered double hydroxide. Therefore, the intercalation of the organic anions between the layers can be achieved during the reconstruction by preliminarily feeding the intended anions (organic anions) in the aqueous solution.

For preparation of the pyrolysis product of the layered double hydroxide, the layered double hydroxide is preferably fired at a heating temperature of 400° C. to 800° C. If the heating temperature is higher than the higher limit described above (e.g., 900° C. or higher in the case of an Mg—Al layered double hydroxide), spinel is liable to be separated from the layered double hydroxide, making it difficult to reconstruct the layered double hydroxide. On the other hand, if the heating temperature is lower than the lower limit described above, the pyrolysis is insufficient, and the carbonate ions are liable to remain.

Thus, the organophilic layered double hydroxide (B) according to the present invention is prepared. The proportion of the organophilic layered double hydroxide (B) is preferably not less than 1 part and less than 20 parts by weight (hereinafter referred to simply as "parts") based on 100 parts of the vinyl polymer (A). If the proportion is less than the lower limit described above, intended effects cannot be produced for the heat resistance and the cohesiveness. On the other hand, if the proportion is not less than the upper limit described above, the organophilic layered double hydroxide tends to be unevenly dispersed in the adhesive agent.

The dimensions of the organophilic layered double hydroxide (B) vary depending upon the chemical composition and the degree of the crystal growth. Typically, the basic unit layers each have a thickness (a single layer thickness) of about 0.47 nm, which may slightly vary depending upon the metal elements for the layers. The crystalline particles of the organophilic layered double hydroxide are in a plate crystal form, and have an average length of 0.02 to 10 μm, preferably 0.02 to 7 μm, particularly preferably 0.1 to 5 μm. The average length of the particles is determined by directly observing the particles by means of an electron microscope (TEM or SEM) or the like. If the average length of the layered double hydroxide particles is less than the lower limit described above, the particles are not properly oriented in the vinyl polymer, failing to provide sufficient cohesiveness and adhesiveness. On the other hand, if the average length is greater than the upper limit described above, the layers strongly interact with each other. Therefore, uniform interlayer separation and dispersion of the organophilic layered double hydroxide is difficult, thereby reducing the elongation.

Exemplary methods for dispersing the organophilic layered double hydroxide (B) in the resin composition include an ultrasonic separation method, a high pressure shearing separation method, a very high speed stirring method, a supercritical $CO_2$ stirring method and the like. Particularly, the high pressure shearing separation method is preferably used, because this method achieves the interlayer separation without fracture of the layered double hydroxide.

Crosslinking Agent (C)

In the present invention, the crosslinking agent (C) is used in combination with the components (A) and (B). The crosslinking agent (C) crosslinks molecular chains of the vinyl polymer (A) to increase the adhesiveness and the cohesiveness of the pressure-sensitive adhesive composition for improvement of the workability. Examples of the crosslinking agent (C) include multifunctional (meth)acrylates each having two or more (meth)acryloyl functional groups in a molecule thereof (hereinafter referred to simply as "multifunctional (meth)acrylates"), isocyanate compounds and epoxy compounds. The (meth)acryloyl group herein means at lest one of an acryloyl group and a methacryloyl group, and the (meth)acrylate herein means at least one of an acrylate and a methacrylate.

Examples of the multifunctional (meth)acrylates include trimethylolpropane tri(meth)acrylate, pentaerythritol tetra(meth)acrylate, 1,2-ethylene glycol di(meth)acrylate, and 1,6-hexanediol di(meth)acrylate, which may be used either alone or in combination.

Examples of the isocyanate compounds include: lower aliphatic polyisocyanates such as butylene diisocyanate and hexamethylene diisocyanate; alicyclic isocyanates such as cyclopentylene diisocyanate, cyclohexylene diisocyanate and isophorone diisocyanate; aromatic isocyanates such as 2,4-tolylene diisocyanate, 4,4'-diphenylmethane diisocyanate and xylylene diisocyanate; and isocyanate adducts such as a trimethylolpropane/tolylene diisocyanate trimer adduct (CORONATE L available from Nippon Polyurethane Co., Ltd.) and a trimethylolpropane/hexamethylene diisocyanate trimer adduct (CORONATE HL available from Nippon Polyurethane Co., Ltd.). These may be used either alone or in combination.

Examples of the epoxy compounds include N,N,N',N'-tetraglycidyl-m-xylenediamine (TETRAD-X available from Mitsubishi Gas Chemical Company, Inc.) and 1,3-bis(N,N-diglycidylaminomethyl)cyclohexane (TETRAD-C available from Mitsubishi Gas Chemical Company, Inc.). These may be used either alone or in combination.

The proportion of the crosslinking agent (C) is 0.02 to 5 parts, preferably 0.1 to 3 parts based on 100 parts of the vinyl polymer (A). Where the crosslinking agent is difunctional, the proportion is higher within this range. Where the crosslinking agent is trifunctional or more, the proportion is lower within this range. If the proportion is less than the lower limit described above, the crosslinking agent fails to produce its effect. On the other hand, if the proportion is greater than the upper limit described above, the resulting adhesive composition tends to be fragile. In either case, the workability tends to be impaired.

As required, various known additives such as an anti-aging agent and a colorant may be blended in the inventive adhesive composition which contains the components (A) to (C).

Pressure-Sensitive Adhesive Sheet

The inventive pressure-sensitive adhesive sheet is produced, for example, by forming the aforementioned adhesive composition into a sheet or a tape, or by forming an adhesive layer of the aforementioned composition on one or both of opposite surfaces of a base sheet.

The inventive adhesive sheet thus produced includes an adhesive layer of the inventive adhesive composition preferably having a thickness of 2 to 50 μm.

Examples of the base sheet to be used for the pressure-sensitive adhesive sheet include a polyethylene terephthalate (PET) film, a polyethylene naphthalate (PEN) film, a polyethersulfone (PES) film, a polyetherimide (PEI) film, a polysulfone (PSF) film, a polyphenylenesulfide (PPS) film, a polyetheretherketone (PEEK) film, a polyarylate (PAR) film, an aramide film, a polyimide film and a liquid crystal polymer (LCP) film. Particularly, the polyimide material is preferred for heat resistance. The thickness of the base sheet is not particularly limited, but preferably about 10 to 250 μm irrespective of the type of the sheet or the film.

In the present invention, a protective film may be used for protecting the adhesive layer and preventing adhesion to other parts. Examples of the protective film include plastic films such as of silicones, long-chain alkyl polymers, fluorinated polymers, aliphatic amide polymers, and polyvinyl chlorides, vinyl chloride copolymers, polyethylene terephthalates, polybutylene terephthalates, polyurethanes, ethylene vinyl acetate copolymers, ionomer resins, ethylene-(meth)acrylic acid copolymers, ethylene-(meth)acrylate copolymers, polystyrenes and polycarbonates which are treated with a silica release agent to be imparted with releasability.

Films of polyolefin resins such as polyethylenes, polypropylenes, polybutenes, polybutadienes and polymethylpentenes intrinsically have releasability even without treatment with the release agent and, therefore, are each usable as the protective film. The protective film preferably has a thickness of about 10 to about 100 μm.

The inventive adhesive composition and the inventive adhesive sheet employing the adhesive composition can be produced, for example, by any of the following methods (i) to (iii):

(i) A solution of the vinyl polymer (A) is prepared by solution polymerization of the polymerizable monomer, and then the organophilic layered double hydroxide (B) and the crosslinking agent (C) and, optionally, other additives are added to the vinyl polymer solution. Thus, a solution of the inventive adhesive composition is prepared, which is applied onto a releasable base sheet or a non-releasable base sheet, and a solvent is evaporated away by drying to provide the adhesive sheet.

(ii) A solid vinyl polymer (A) containing no solvent is prepared by solution polymerization, suspension polymerization or mass polymerization (UV polymerization) of the polymerizable monomer, and then the organophilic layered double hydroxide (B) and the crosslinking agent (C) and, optionally, other additives are added to the vinyl polymer. Thus, the inventive adhesive composition is prepared, which is extruded by a melt-extruder to provide the adhesive sheet.

(iii) The organophilic layered double hydroxide (B) and the crosslinking agent (C) and, optionally, other additives are mixed with the polymerizable monomer, and the resulting mixture is applied onto the base sheet. Then, a transparent mask such as of a polyester film is placed on the applied mixture, which is in turn irradiated with ultraviolet radiation to be thereby polymerized. Thus, the inventive adhesive composition containing a matrix of the vinyl polymer (A) and the inventive adhesive sheet are produced.

In the methods (i) to (iii), a proper polymerization initiator may be used for the polymerization of the polymerizable monomer. As the polymerization initiator, exemplary thermal polymerization initiators which thermally generate radicals include azo compounds such as azobisisobutyronitrile, and organic peroxides such as benzoyl peroxide and cumene hydroperoxide. Exemplary photo polymerization initiators which generate radicals by photoaction include benzoin ethers, substituted benzoin ethers, substituted acetophenones, substituted α-ketols, aromatic sulfonyl chlorides and photoactive oximes.

The applications of the inventive pressure-sensitive adhesive sheet are not particularly limited, but exemplary applications include production and construction of electronic parts and automotive parts, which require heat resistance and cohesiveness.

Next, inventive examples will be described in conjunction with comparative examples. It should be understood that the invention be not limited to the inventive examples.

EXAMPLES

Preparation and synthesis of the following ingredients will be described prior to the description of the examples.

Vinyl Polymer (A)

First, 100 parts of butyl acrylate, 3 parts of acrylic acid and 150 parts of toluene were put in a reaction vessel provided with a condenser, a nitrogen introduction tube, a thermometer and a stirrer, and the resulting mixture was stirred at 60° C. for 1 hour with nitrogen gas being introduced into the vessel. Then, 0.2 parts of benzoyl peroxide was added to the mixture, and a reaction was allowed to proceed at 60° C. for 10 hours. Thus, an acryl polymer was prepared.

Organophilic Layered Double Hydroxide (B)

Untreated layered double hydroxides were prepared for preparation of organophilic layered double hydroxides.

Preparation of Layered Double Hydroxides

Synthesis 1: Layered Double Hydroxide b1

First, 16.2 g of magnesium chloride hexahydrate ($MgCl_2.6H_2O$ of a special grade reagent available from Wako Pure Chemical Industries, Ltd.) and 10.0 g of aluminum chloride hexahydrate ($AlCl_3.6H_2O$ of a special grade reagent available from Wako Pure Chemical Industries, Ltd.) were dissolved in 4 L of decarbonated distilled water, whereby an aqueous solution ($MgCl_2/AlCl_3$) containing magnesium chloride and aluminum chloride in a blend ratio of Mg/Al=2/1 (ratio in mol %) was prepared. Then, 16.9 g of sodium hydroxide (NaOH of a special grade reagent available from Wako Pure Chemical Industries, Ltd.) was dissolved in 1 L of decarbonated distilled water, whereby a sodium hydroxide aqueous solution was prepared. The sodium hydroxide aqueous solution was added dropwise to the $MgCl_2/AlCl_3$ aqueous solution to, adjust the final pH at about 10, while the $MgCl_2/AlCl_3$ aqueous solution was stirred. After the resulting solution was aged at about 60° C. for 6 hours in a nitrogen atmosphere, the resulting product was repeatedly filtered and rinsed, and dried. Thus, a powdery layered double hydroxide b1 was prepared.

Synthesis 2: Layered Double Hydroxide b2

A layered double hydroxide b2 was prepared in substantially the same manner as in Synthesis 1, except that an $MgCl_2/AlCl_3$ aqueous solution containing 31.0 g of magnesium chloride hexahydrate and 10.0 g of aluminum chloride hexahydrate in a ratio of Mg/Al=4/1 (ratio in mol %) was used instead of the $MgCl_2/AlCl_3$ aqueous solution of Synthesis 1.

Synthesis 3: Layered Double Hydroxide b3

A layered double hydroxide b3 was prepared in substantially the same manner as in Synthesis 1, except that a $ZnCl_2/AlCl_3$ aqueous solution containing 11.3 g of zinc chloride ($ZnCl_2$ of a special grade reagent available from Kanto Chemical Industry Co., Ltd.) and 10.0 g of aluminum chloride hexahydrate in a ratio of Zn/Al=2/1 (ratio in mol %) was used instead of the $MgCl_2/AlCl_3$ aqueous solution of Synthesis 1.

Synthesis 4: Layered Double Hydroxide b4

A layered double hydroxide b4 was prepared in substantially the same manner as in Synthesis 1, except that a $CoCl_2/AlCl_3$ aqueous solution containing 19.7 g of cobalt chloride hexahydrate ($CoCl_2.6H_2O$ of a special grade reagent available from Wako Pure Chemical Industries, Ltd.) and 10.0 g of aluminum chloride hexahydrate in a ratio of Co/Al=2/1 (ratio in mol %) was used instead of the $MgCl_2/AlCl_3$ aqueous solution of Synthesis 1.

Synthesis 5: Layered Double Hydroxide b5

A layered double hydroxide b5 was prepared in substantially the same manner as in Synthesis 1, except that an $NiCl_2/AlCl_3$ aqueous solution containing 19.7 g of nickel chloride hexahydrate ($NiCl_2.6H_2O$ of a special grade reagent available from Wako Pure Chemical Industries, Ltd.) and 9.7 g of aluminum chloride hexahydrate in a ratio of Ni/Al=2/1 (ratio in mol %) was used instead of the $MgCl_2/AlCl_3$ aqueous solution of Synthesis 1.

Synthesis 6: Layered Double Hydroxide b6

A layered double hydroxide b6 was prepared in substantially the same manner as in Synthesis 1, except that a $CaCl_2/AlCl_3$ aqueous solution containing 8.9 g of calcium chloride ($CaCl_2$ of a special grade reagent available from Wako Pure Chemical Industries, Ltd.) and 9.7 g of aluminum chloride hexahydrate in a ratio of Ca/Al=2/1 (ratio in mol %) was used instead of the $MgCl_2/AlCl_3$ aqueous solution of Synthesis 1.

Synthesis 7: Layered Double Hydroxide b7

First, 9.6 g of lithium hydroxide (LiOH of a special grade reagent available from Kanto Chemical Industry Co., Ltd.) was dissolved in 200 mL of distilled water, whereby a lithium hydroxide aqueous solution was prepared. Then, aluminum nitrate nonahydrate was dissolved in decarbonated distilled water to prepare an aluminum nitrate aqueous solution having a concentration of 0.5 mol/L. The aluminum nitrate aqueous solution was slowly added dropwise to the lithium hydroxide aqueous solution to adjust the final pH at about 10 to about 11, while the lithium hydroxide aqueous solution was stirred. Thus, precipitate was provided. In this state, the precipitate was aged at about 60° C. for three days, repeatedly filtered and rinsed, and dried. Thus, a powdery layered double hydroxide b7 was prepared.

The basal spacing of each of the layered double hydroxides thus prepared was measured by the following test method. The results of the measurement are shown in Table 1. Here, the basal spacing is herein defined as a distance between the basal plane of the first layer and the basal plane of the second adjacent layer, and corresponds to a distance between periodic structures which appear as peaks in an X-ray diffraction pattern.

Measurement of Basal Spacing

The basal spacing of each of the synthesized layered double hydroxides was determined through X-ray diffraction (XRD) measurement. With the use of an X-ray diffraction apparatus (RINT2200 available from Rigaku Corporation), the measurement was performed with CuKα radiation at 40 kV and 30 mA, a divergence slit angle of 1 degree, a divergence vertical limit slit width of 10 mm, a scattering slit width of 1.25 mm, a receiving slit width of 0.3 mm, a scan speed of 2 degrees/min and a sampling width of 0.02 degrees.

TABLE 1

| | Layered double hydroxide | Basal spacing (nm) |
|---|---|---|
| Synthesis 1 | b1 | 0.79 |
| Synthesis 2 | b2 | 0.79 |

TABLE 1-continued

| | Layered double hydroxide | Basal spacing (nm) |
|---|---|---|
| Synthesis 3 | b3 | 0.77 |
| Synthesis 4 | b4 | 0.77 |
| Synthesis 5 | b5 | 0.76 |
| Synthesis 6 | b6 | 0.85 |
| Synthesis 7 | b7 | 0.85 |

Next, the layered double hydroxides prepared in the aforementioned manner were organically treated in the following manner.

Organic Treatment of Layered Double Hydroxides L
Synthesis 8: Organophilic Layered Double Hydroxide B1

First, 6.5 g of the layered double hydroxide b1 prepared in Synthesis 1 was put in 1 L of decarbonated distilled water, and the resulting mixture was stirred at 40° C. with nitrogen gas being bubbled. Thus, a homogeneous dispersion was prepared. Then, 3.54 g of sodium laurate (available from Wako Pure Chemical Industries, Ltd.) was dissolved in 300 mL of decarbonated distilled water at about 50° C., and the resulting solution was added as an organic treatment agent to the dispersion. The resulting mixture was stirred at about 50° C. for 3 hours. Thereafter, the resulting product was filtered and rinsed three times, and finally dried and triturated. Thus, a organophilic layered double hydroxide B1 was prepared.

Synthesis 9: Organophilic Layered Double Hydroxide B2

An organophilic layered double hydroxide B2 was prepared in substantially the same manner as in Synthesis 8, except that the layered double hydroxide b2 was used instead of the layered double hydroxide b1 of Synthesis 8.

Synthesis 10: Organophilic Layered Double Hydroxide B3

An organophilic layered double hydroxide B3 was prepared in substantially the same manner as in Synthesis 8, except that the layered double hydroxide b3 was used instead of the layered double hydroxide b1 of Synthesis 8.

Synthesis 11: Organophilic Layered Double Hydroxide B4

An organophilic layered double hydroxide B4 was prepared in substantially the same manner as in Synthesis 8, except that the layered double hydroxide b4 was used instead of the layered double hydroxide b1 of Synthesis 8.

Synthesis 12: Organophilic Layered Double Hydroxide B5

An organophilic layered double hydroxide B5 was prepared in substantially the same manner as in Synthesis 8, except that the layered double hydroxide b5 was used instead of the layered double hydroxide b1 of Synthesis 8.

Synthesis 13: Organophilic Layered Double Hydroxide B6

An organophilic layered double hydroxide B6 was prepared in substantially the same manner as in Synthesis 8, except that the layered double hydroxide b6 was used instead of the layered double hydroxide b1 of Synthesis 8.

Synthesis 14: Organophilic Layered Double Hydroxide B7

An organophilic layered double hydroxide B7 was prepared in substantially the same manner as in Synthesis 8, except that the layered double hydroxide b7 was used instead of the layered double hydroxide b1 of Synthesis 8.

The basal spacing of each of the organophilic layered double hydroxides thus prepared was measured in the aforementioned manner. The results are shown in Table 2.

TABLE 2

| | Organophilic layered double hydroxide (B) | Basal spacing (nm) |
|---|---|---|
| Synthesis 8 | B1 | 2.3 |
| Synthesis 9 | B2 | 2.3 |
| Synthesis 10 | B3 | 2.3 |
| Synthesis 11 | B4 | 2.3 |
| Synthesis 12 | B5 | 2.3 |
| Synthesis 13 | B6 | 3.3 |
| Synthesis 14 | B7 | 2.4 |

As apparent from the results shown in Table 2, the organophilic layered double hydroxides prepared in Syntheses 8 to 14 each have an increased basal spacing, indicating that lauric acid molecules were intercalated between layers of the organophilic layered double hydroxide.

Organophilic Layered Clay Mineral (Corresponding to Component (B) for Comparative Examples)

A synthetic smectite (Lucentite SPN available from Co-op Chemical Co., Ltd.) treated with polyoxypropylene methyldiethyl ammonium to be imparted with an interlayer hydrophobic property.

Crosslinking Agent (C) C1

An epoxy compound (TETRAD C available from Mitsubishi Gas Chemical Company,

Inc.)

Crosslinking Agent (C) C2

A polyisocyanate compound (CORONATE L available from Nippon Polyurethane Co.,

Ltd..)

Examples 1 to 10 and Comparative Examples 1 to 3

The aforementioned ingredients to be used in the examples and the comparative examples were blended in proportions shown in Table 3 to prepare composite adhesive solutions. More specifically, acryl adhesive solutions were each prepared by mixing the vinyl polymer (A) and the crosslinking agent (C) in proportions shown in Table 3. Then, the synthesized organophilic layered double hydroxides (B) and the layered clay mineral were respectively blended in the acryl adhesive solutions, and the resulting mixtures are each stirred by a stirrer and further stirred by a wet ultra-fine disintegrator (NANOMIZER (registered trade mark) available from Yoshida Kikai Kogyo Co., Ltd.) Thus, Composite adhesive solutions were prepared.

TABLE 3

|  | Example | | | | | | | | | | Comparative Example (parts by weight) | | |
|---|---|---|---|---|---|---|---|---|---|---|---|---|---|
|  | 1 | 2 | 3 | 4 | 5 | 6 | 7 | 8 | 9 | 10 | 1 | 2 | 3 |
| Vinyl polymer (A) | 100 | 100 | 100 | 100 | 100 | 100 | 100 | 100 | 100 | 100 | 100 | 100 | 100 |
| Organophilic layered double hydroxide (B) | | | | | | | | | | | | | |
| B1 | 5 | 3 | 3 | — | — | — | — | — | — | — | — | — | — |
| B2 | — | — | — | 3 | — | — | — | — | — | — | — | — | — |
| B3 | — | — | — | — | 3 | — | — | — | — | 0.9 | — | — | — |
| B4 | — | — | — | — | — | 3 | — | — | — | — | — | — | — |
| B5 | — | — | — | — | — | — | 3 | — | — | — | — | — | — |
| B6 | — | — | — | — | — | — | — | 3 | — | — | — | — | — |
| B7 | — | — | — | — | — | — | — | — | 3 | — | — | — | — |
| Organophilic layered clay mineral | — | — | — | — | — | — | — | — | — | — | — | — | 5 |
| Crosslinking agent (C) | | | | | | | | | | | | | |
| C1 | 2 | — | 2 | — | — | — | — | — | — | — | — | 2 | 2 |
| C2 | — | 2 | — | 2 | 2 | 2 | 2 | 2 | 2 | 2 | 2 | — | — |

The composite adhesive solutions thus prepared were each applied onto a 25-μm thick polyimide film (APICAL 25NPI available from Kaneka Corporation), and dried to form a 23-μm thick adhesive layer. A polyester film (MRF50 available from Mitsubishi Chemical Polyester Film Co., Ltd.) having a surface treated with a silicone release agent was applied on the adhesive layer with the treated surface thereof in contact with the adhesive layer. Thus, a pressure-sensitive adhesive sheet was produced. For use, the polyester film treated with the silicone release agent is removed from the pressure-sensitive adhesive sheet, and bonded to an object.

The pressure-sensitive adhesive sheet thus produced was brought into intimate contact with a glass plate, and an adhesive strength test was performed in the following manner by a 180-degree peeling method. The results are shown in Table 4.

Adhesive Strength

The adhesive strength test was performed in conformity with JIS 20237 by using a soda glass plate as an object to be bonded. A test piece having a size of 20 mm (width)×80 mm (length) was cut out of the pressure-sensitive adhesive sheet, and pressed on the glass test plate at 23° C. at 60% RH by moving a 2-kg rubber roller back and forth over the test piece. The test piece was allowed to stand for 30 minutes, and set in a tensile tester. Then, an adhesive strength was determined by peeling the test piece at 180 degrees at a tensile speed of 300 mm/min, and defined as "adhesive strength before heating." Another test piece of the adhesive sheet applied on a glass plate in the same manner as described above was heated at 150° C. for 1 hour, and cooled to a room temperature. Then, an adhesive strength was determined in the same manner, and defined as "adhesive strength after heating."

sive properties. Further, the adhesive sheets of the inventive examples each had little variations in adhesive strength. Where a homopolymer of butyl acrylate, or a homopolymer or a copolymer of other (meth)acrylate containing a $C_4$ to $C_{14}$ alkyl group was used instead of the vinyl polymer (A) in the inventive examples, the same effects as described above were provided.

On the other hand, the adhesive sheets of Comparative Examples 1 and 2 which contained no organophilic layered double hydroxide (B) were poorer in adhesive properties after heating and in heat resistance. The adhesive sheet of Comparative Example 3 which contained the organophilic layered clay mineral (synthetic hydrophobic smectite) was further poorer in adhesive properties after heating and in heat resistance.

Industrial Applicability

The inventive acrylic adhesive composition is used as a pressure-sensitive adhesive sheet material which requires heat resistance and cohesiveness in production and construction of electronic parts and automotive parts.

What is claimed is:

1. An acrylic pressure-sensitive adhesive composition comprising:
   (A) a copolymer of butyl acrylate and acrylic acid;
   (B) an organophilic layered double hydroxide organically treated with an organic anion; and
   (C) a crosslinking agent,
   wherein the layered double hydroxide to be organically treated to provide the component (B) is a non-stoichiometric compound represented by one of the following general formula (1) and (2):

TABLE 4

|  | Example | | | | | | | | | | Comparative Example | | |
|---|---|---|---|---|---|---|---|---|---|---|---|---|---|
|  | 1 | 2 | 3 | 4 | 5 | 6 | 7 | 8 | 9 | 10 | 1 | 2 | 3 |
| Adhesive strength (N/20 mm) | | | | | | | | | | | | | |
| 23° C. | 4.7 | 3.5 | 4.6 | 4.6 | 5.6 | 5.4 | 4.9 | 5.1 | 6.8 | 4.9 | 5.0 | 2.9 | 2.3 |
| After heating (150° C. × 1 hr) | 8.5 | 11.5 | 12.8 | 12.8 | 16.3 | 12.5 | 12.3 | 8.0 | 13.8 | 13.5 | 5.7 | 3.9 | 2.9 |

The results shown in Table 4 indicate that the adhesive sheets of the inventive examples had sufficient adhesiveness to the object and, even after the heating, had excellent adhe-

$$[M^{2+}{}_{1-x}M^{3+}{}_x(OH)_2]^{x+}[A^{n-}{}_{x/n}\cdot mH_2O]^{x-} \quad (1)$$

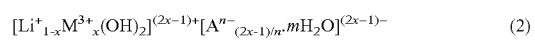

$$[Li^+{}_{1-x}M^{3+}{}_x(OH)_2]^{(2x-1)+}[A^{n-}{}_{(2x-1)/n}\cdot mH_2O]^{(2x-1)-} \quad (2)$$

wherein $M^{2+}$ is a metal ion of at least one divalent metal selected from the group consisting of Mg, Ca, Mn, Fe, Co, Ni, Cu and Zn; $M^{3+}$ is a metal ion of at least one trivalent metal selected from the group consisting of Al, Fe, Cr, Mn, Co, Ni, La and Ga; $A^{n-}$ is an n-valent inorganic anion selected from the group consisting of $OH^-$, $ClO_3^-$, $ClO_4^-$, $F^-$, $Cl^-$, $Br^-$, $I^-$, $CO_3^{2-}$, $NO_3^-$ and $SO_4^{2-}$; x is a positive number with 0<x<0.5; m is a positive number with 0<m; and n is a valence of the inorganic anion, wherein the component (B) is present in a proportion of from 3 parts by weight to 5 parts by weight based on 100 parts by weight of the component (A), wherein the component (C) is present in a proportion of from 0.1 to 3 parts by weight based on 100 parts by weight of the component (A), and wherein an adhesive strength of the acrylic pressure sensitive adhesive at 23° C. is from 3.5 to 6.8 N/20 mm.

2. The acrylic pressure-sensitive adhesive composition as set forth in claim 1, wherein the organic anion for the component (B) is at least one of an anion derived from an amino acid, and an anion derived from a fatty acid.

3. The acrylic pressure-sensitive adhesive composition as set forth in claim 1, wherein the component (C) crosslinks molecular chains of the component (A), and is at least one selected from the group consisting of a multifunctional (meth)acrylate having at least two (meth)acryloyl functional groups in its molecule, an isocyanate compound and an epoxy compound.

4. A pressure-sensitive adhesive sheet comprising the acrylic pressure-sensitive adhesive composition as set forth in claim 1.

5. The acrylic pressure-sensitive adhesive composition as set forth in claim 1, wherein the component (B) is in a plate crystal form, and has an average length of 0.02 to 10 µm.

6. The acrylic pressure-sensitive adhesive composition as set forth in claim 1, wherein a single layer thickness of the component (B) is about 0.47 nm.

7. A pressure-sensitive adhesive layer comprising the acrylic pressure-sensitive composition as set forth in claim 1, wherein the pressure-sensitive adhesive layer is peelable after pressure-sensitive adhesion.

8. A pressure-sensitive adhesive sheet having a pressure-sensitive adhesive layer comprising the acrylic pressure-sensitive composition as set forth in claim 1, wherein the pressure-sensitive adhesive layer is peelable after pressure-sensitive adhesion.

9. The acrylic pressure-sensitive adhesive composition as set forth in claim 1, wherein the adhesive strength of the acrylic pressure-sensitive adhesive at 23° C. is from 4.6 to 6.8 N/mm.

* * * * *